F. J. LOGSDON.
CORN HEADER.
APPLICATION FILED AUG. 5, 1912.
1,055,341. Patented Mar. 11, 1913.
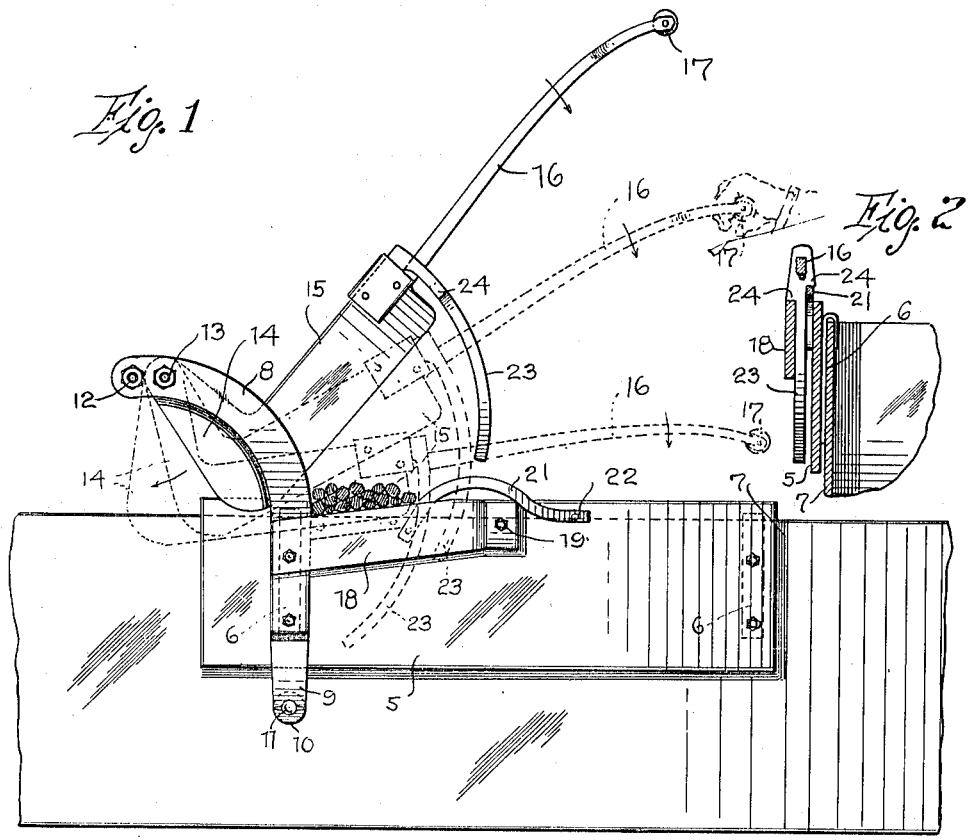
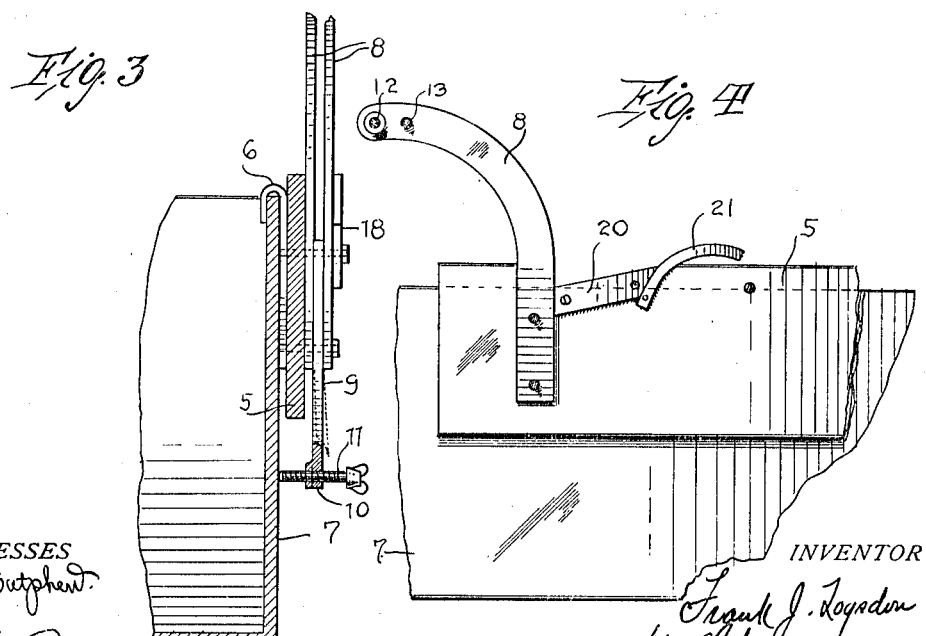
WITNESSES
INVENTOR
Frank J. Logsdon
Attorney

UNITED STATES PATENT OFFICE.

FRANK J. LOGSDON, OF EMPORIA, KANSAS.

CORN-HEADER.

1,055,341.  Specification of Letters Patent.  Patented Mar. 11, 1913.

Application filed August 5, 1912. Serial No. 713,494.

*To all whom it may concern:*

Be it known that I, FRANK J. LOGSDON, a citizen of the United States, residing at Emporia, in the county of Lyon and State of Kansas, have invented new and useful Improvements in Corn-Headers, of which the following is a specification.

The present invention relates to means for cutting the heads from the stalks of Kafir corn in the field, and one of the primary objects is to provide apparatus of the character that is in the form of an attachment, which can be applied to an ordinary wagon body in a position to permit the heads to be severed, so that the same will fall into the body, leaving the stalks in standing position, so that the same may be cut and shocked separately.

A further and important object is to provide a simple header that is entirely practical and easily operated.

In the accompanying drawings:—Figure 1 is a side elevation of a portion of a wagon body, showing the cutter or header in place thereon. Fig. 2 is a detail sectional view of the same, with the cutting knife in its lowered position. Fig. 3 is also a cross sectional view of the same, with the knife removed and the upper ends of the bracket arms broken off. Fig. 4 is a longitudinal sectional view.

Similar reference numerals designate corresponding parts in all the figures of the drawings.

In the embodiment disclosed, a base or support is employed that is in the form of an elongated plate or board 5 arranged on edge, and having bolted to its rear side a pair of hooks 6 arranged to engage over the edge of the side-board or wall of a wagon body 7, as will be clear by reference to Figs. 2 and 3.

Secured to one end of the board, is a pair of upwardly extending curved bracket arms 8 spaced apart by a depending bar 9 located between their lower ends, this bar projecting below the support 5 and terminating in a threaded eye 10. A clamp screw 11 is threaded through the eye and is arranged to bear against the side of the vehicle body, as illustrated in Fig. 3. The upper ends of the arms 8 are secured together by a bolt 12, and directly adjacent to this bolt is a pivot bolt 13, on which is hung the upwardly extending end 14 of a cutter knife 15 that operates between the arms, as will be evident.

This knife is provided with a suitable shank 16, which terminates in a handle grip 17. Extending longitudinally of the base or support 5 from the arms 8, is a ledger blade 18 having its end inturned and fastened as shown at 19 to the said support. The main portion of this blade 18 is spaced from the support 5, and located behind it in spaced relation thereto, is another blade 20, shown in Fig. 4 and secured flat against the support 5. A curved guide bar 21 extends from the ledger blade 20 over the secured end of the ledger blade 18, and is suitably fastened to the base, as shown at 22. The cutting blade 15 is arranged to operate between the ledger blades 18 and 20, and a curved retaining finger 23, carried by the cutting blade 15, moves downwardly across the open side and into the space between the ledger blade 18 and the guide 21. In order to limit the downward movement of the cutting blade, this finger is provided contiguous to its upper end with a pair of oppositely disposed shoulders 24 that respectively engage the guide 21 and the ledger blade 18, as illustrated in Fig. 2.

In using the device, the support 5 is engaged over the side of the wagon body, and is clamped by means of the set screw 11. The operator then drives the wagon along the stalk rows, and first, lifting the blade 15, so that the finger 23 is disengaged from the lower structure, bends the stalks so that the heads will lie over the body. Upon swinging the blade 15 downwardly, the heads are severed from the stalks, and will drop into the body. This action is repeated all along the row, and consequently the heads will be collected without in any manner affecting the stalks, which remain standing to be harvested later.

There are a number of advantages for the structure. In the first place, the mounting of the device can be made upon any ordinary vehicle, and experience has demonstrated that it will be effectively held in place. It will be clear that the ledger blades 18 and 20 together with the upstanding arms form a holder for the grain. The open side of this holder permits the ready introduction of the grain on the ledger blades 18 and 20, and the guide 21 prevents their initial displacement. When the blade 15 is moved downwardly, its arrangement is such that there would naturally be a tendency to force the stalks outwardly, but inasmuch as the finger 23 first passes down between the blade 18 and the guide 21, said finger acts as means for retaining the grain in place, and insures that the heads will be severed from the stalks. This finger also constitutes a guide that prevents the lateral displacement of the blade 15, and the shoulders thereon form stops for preventing the blade moving downwardly too far and becoming caught or lodged.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In apparatus of the character set forth, the combination with a grain-holding member having an upstanding portion at one end, of a cutter blade pivoted to the upstanding portion and movable downwardly toward the member and toward said upstanding portion, said blade when elevated leaving an open space between its free end and the corresponding end of the grain-holding member to permit the lateral introduction of grain therebetween, and a depending retaining finger carried by the free end portion of the blade and moving downwardly therewith across the open space, said finger also moving toward the upstanding portion to crowd the grain toward the same upon its said downward movement.

2. In apparatus of the character set forth, the combination with a grain-holding member comprising a ledger blade and an upstanding arm having its upper end turned away from said blade, of a cutter blade pivoted to the said upper end of the arm and movable downwardly toward the ledger blade and toward the arm, said blade when elevated leaving an open space between the free end and the corresponding end of the ledger blade to permit the lateral introduction of grain therebetween, and a depending curved retaining finger carried by the free end portion of the blade and movable downwardly therewith across the open space and across the ledger blade, said finger also moving longitudinally of the ledger blade and toward the upstanding arm to crowd the grain toward the latter upon the downward movement of the cutter blade.

3. In apparatus of the character set forth, the combination with a grain-holding member having an open side, of a cutter pivoted to the opposite side and movable downwardly to cut the grain supported by said member, and an upwardly curved guide forming the bottom of the open side and disposed longitudinally of the blade.

4. In apparatus of the character set forth, the combination with a vertically disposed plate, of means carried by the plate for attaching the same to a wagon body, upwardly spaced arms mounted on the plate, spaced ledger blades arranged adjacent to the arms, a cutting blade pivoted to the arms and movable downwardly into coöperating relation with the ledger blades, and a finger carried by the cutting blade and movable downwardly between the ledger blades, said finger having a stop forming part thereof for limiting the downward movement of the blade.

FRANK J. LOGSDON.

Witnesses:
O. S. SAMUEL,
CHARLES S. GIBSON.